United States Patent [19]

Ohnishi

[11] Patent Number: 5,747,599
[45] Date of Patent: May 5, 1998

[54] THERMOSETTING COATING COMPOSITION

[75] Inventor: Kazuhiko Ohnishi, Yokohama, Japan

[73] Assignee: Kansai Paint Company, Limited, Amagaski, Japan

[21] Appl. No.: 917,747

[22] Filed: Aug. 27, 1997

Related U.S. Application Data

[63] Continuation of Ser. No. 567,238, Dec. 5, 1995, abandoned.

[30] Foreign Application Priority Data

Dec. 12, 1994 [JP] Japan ..................... 6-307200
Jul. 25, 1995 [JP] Japan ..................... 7-188753

[51] Int. Cl.$^6$ ........................................... C08G 59/18
[52] U.S. Cl. ................ 525/327.3; 528/90; 525/166; 525/170; 525/176; 525/505; 525/934; 523/451; 523/453; 523/455
[58] Field of Search ............... 528/90; 525/327.3, 525/505, 934, 166, 170, 176; 523/451, 453, 455

[56] References Cited

U.S. PATENT DOCUMENTS

| | | | |
|---|---|---|---|
| 4,216,288 | 8/1980 | Crivello | 528/90 |
| 5,013,814 | 5/1991 | Roth et al. | 528/90 |
| 5,359,017 | 10/1994 | Hamazu et al. | 526/211 |

OTHER PUBLICATIONS

Chemical Abstracts 117:49400, "Photocrosslinking of Polymers Initiated by Bezylsulfonium Salts as Cationic Initiators", Lin et al., 1992.

*Primary Examiner*—Frederick Krass
*Attorney, Agent, or Firm*—Armstrong, Westerman, Hattori, Mcleland & Naughton

[57] ABSTRACT

Disclosed is a thermosetting coating composition comprising (A) an epoxy compound and (B) an aromatic sulfonium salt represented by the formula

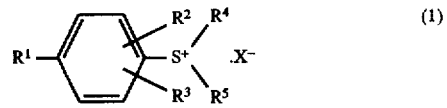

wherein $R^1$ represents a hydrogen atom, a hydroxyl group, an alkoxyl group, or a group represented by the formula

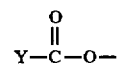

wherein Y represents an alkyl group, an alkoxyl group, a phenyl group or a phenoxy group all of which may have a substituent, each of $R^2$ and $R^3$ represents a hydrogen atom, a halogen atom, or an alkyl group, each of $R^4$ and $R^5$ represents an alkyl group, an aralkyl group or an aryl group all of which may have a substituent, and $X^-$ represents $SbF_6^-$, $PF_6^-$, $AsF_6^-$, or $BF_4^-$.

7 Claims, No Drawings

THERMOSETTING COATING COMPOSITION

This application is a continuation of application Ser. No. 08/567,238 filed Dec. 5, 1995, now abandoned.

The present invention relates to a novel thermosetting coating composition.

There have been conventionally used thermosetting coating compositions comprising an epoxy resin and a polycarboxylic acid as a curing agent, such as dodecanedicarboxylic acid, phthalic acid, adipic acid, etc.

However, these thermosetting coating compositions have the drawback of involving baking at a high temperature of not lower than 160° C. Further, when the thermosetting coating composition is used as a powder type, the following disadvantages are entailed. The presence of the curing agent in the powder coating composition reduces the softening point of the epoxy resin, thereby causing the powders to become fusion-bonded to each other and blocked. Furthermore, in this case, the powders may become less flowable owing to the crosslinking reaction proceeding during storage, leading to degradation of storage stability. On the other hand, the thermosetting coating composition used as an organic solvent type has the shortcoming of giving a coating film unsatisfactory in properties due to a low solubility of the curing agent in an organic solvent.

An object of the present invention is to provide a novel thermosetting coating composition free of the foregoing prior art drawbacks.

Another object of the invention is to provide a novel thermosetting coating composition which is excellent in storage stability, low temperature curability and the properties of the resulting coating film.

Other objects and features of the present invention will become apparent from the following description.

According to one aspect of this invention, there is provided a thermosetting coating composition comprising (A) an epoxy compound and (B) an aromatic sulfonium salt represented by the formula

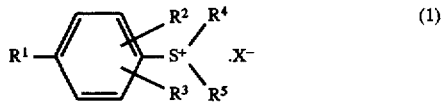 (1)

wherein $R^1$ represents a hydrogen atom, a hydroxyl group, an alkoxyl group, or a group represented by the formula

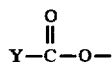

wherein Y represents an alkyl group, an alkoxyl group, a phenyl group or a phenoxy group all of which may have a substituent, each of $R^2$ and $R^3$ represents a hydrogen atom, a halogen atom or an alkyl group, each of $R^4$ and $R^5$ represents an alkyl group, an aralkyl group or an aryl group all of which may have a substituent, and $X^-$ represents $SbF_6^-$, $PF_6^-$, $AsF_6^-$ or $BF_4^-$.

According to another aspect of the present invention, there is provided a thermosetting coating composition comprising:

(A) an epoxy compound, (B) the foregoing aromatic sulfonium salt, and (C) an acidic pigment, or (D) a neutral or basic pigment and (E) an acidic substance.

The inventor of the present invention conducted extensive research to overcome the foregoing prior art drawbacks and found that a thermosetting coating composition comprising an epoxy compound and the foregoing specific aromatic sulfonium salt having a catalytic activity for ring opening cationic polymerization of an epoxy group is improved in storage stability, low temperature curability, etc. and also in properties of the resulting coating film. Another discovery was that even if said composition further contains an acidic pigment, or instead a combination of a neutral or basic pigment and an acidic substance, the curability is not reduced.

The present invention has been accomplished based on these novel findings.

The thermosetting coating compositions of the present invention are suitable for use as either a powder composition or an organic solvent composition.

The epoxy compound (A) for use in the coating composition of the invention includes conventional low molecular weight epoxy compounds as well as a variety of conventional high molecular weight epoxy compounds.

Such epoxy compounds include liquid epoxy compounds having a melting point of lower than 60° C. and solid epoxy compounds having a melting point of not lower than 60° C., preferably about 60° to about 200° C. The solid epoxy compound is used as a base resin for preparing the powder coating composition of the invention. The liquid or solid epoxy compound is used as a base resin for preparing the organic solvent coating composition of the invention.

Liquid epoxy compounds include conventional epoxy compounds. Specific examples are bisphenol-epichlorohydrin type epoxy compounds such as Epikote 807, Epikote 828, Epikote 834, Epikote 1001 and Epikote 5050 (trademarks for products of Yuka Shell Epoxy Co., Ltd.); novolak type epoxy compounds such as DEN-431 and DEN-438 (trademarks for products of Dow Chemical Co.); polyalkylene ether type epoxy compounds such as (poly) ethylene glycol diglycidyl ether, (poly)propylene glycol diglycidyl ether, trimethylolpropane triglycidyl ether, etc.; glycidyl ester type epoxy compounds such as dimer acid diglycidyl ester, phthalic acid diglycidyl ester, tetrahydrophthalic acid diglycidyl ester, etc.; alicyclic epoxy compounds such as 3,4-epoxycyclohexenecarboxylic acid ethylene glycol diester, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, bis(3,4-epoxycyclohexylmethyl)adipate, dicyclopentadiene dioxide, ERL-4221 and ERL-4299 (trademarks, products of Union Carbide Corp.), CY-177 and CY-179 (trademarks, products of Ciba Geigy Co.); homopolymers of unsaturated epoxy-containing monomers such as glycidyl (meth)acrylate, allylglycidyl ether, 3,4-epoxycyclohexylmethyl (meth) acrylate, etc. and copolymers of said monomers with other unsaturated soft monomers. The unsaturated soft monomers refer to those whose homopolymers have a glass transition temperature of lower than 60° C. Examples of such monomers are methyl acrylate, ethyl acrylate, butyl (meth) acrylate, isobutyl (meth)acrylate, 2-ethylhexyl (meth) acrylate, lauryl methacrylate, etc.

Solid epoxy compounds include conventional epoxy compounds. Specific examples are bisphenol-epichlorohydrin type epoxy compounds such as Epikote 1001, Epikote 1004, Epikote 1007 and Epikote 1009 (trademarks for products of Yuka Shell Epoxy Co., Ltd.); cresol novolak type epoxy compounds such as EOCN-1020 (trademark, product of Nihon Kayaku, Co., Ltd.); and copolymers of said unsaturated epoxy-containing monomers with other unsaturated hard monomers. The unsaturated hard monomers are those whose homopolymers have a glass transition temperature of not lower than 60° C., such as methyl methacrylate, t-butyl methacrylate, acrylonitrile, methacrylonitrile, styrene, etc.

The copolymers of said unsaturated epoxy-containing monomers may be prepared from unsaturated epoxy-containing monomers, unsaturated soft or hard monomers and optionally comonomers, e.g. unsaturated hydroxyl-containing monomers, unsaturated carboxyl-containing monomers, silane compounds, amide compounds, etc.

The number average molecular weight of the epoxy compound used in the invention is not specifically limited, but suitably in the range of about 130 to about 100,000, preferably about 300 to about 80,000. The epoxy equivalent of the epoxy compound used in the invention is not critical but suitably in the range of about 65 to about 50,000, preferably about 180 to about 5,000. If use is made of an epoxy compound outside said ranges in the number average molecular weight and epoxy equivalent, it is difficult to provide a coating composition excellent in all of storage stability, low temperature curability and film properties.

It is essential in the present invention to use the epoxy compound (A) and the aromatic sulfonium salt (B) represented by the formula (1). The sulfonium salt (B) serves as a catalyst for ring opening cationic polymerization of an epoxy group and contributes to improvement in the low temperature curability. Since this catalyst does not exhibit any catalytic action at room temperature, the coating composition assures a high storage stability. On the other hand, the catalyst shows a high catalytic action at a temperature of 100° C. or higher, assuring enhanced properties of cured coating.

Boron trifluoride and tetraethyl ammonium bromide, besides said sulfonium salt, are known as a catalyst for ring opening cationic polymerization of an epoxy group. But these compounds are unable to give a coating composition which is satisfactory both in storage stability and low temperature curability.

The alkoxyl group represented by $R^1$ or Y in the formula (1) includes $C_{1-4}$ alkoxyl groups such as methoxy, ethoxy, etc. The alkyl group represented by Y in the formula (1) includes $C_{1-4}$ alkyl groups such as methyl, ethyl, etc. Examples of substituents which the alkyl or alkoxyl group represented by Y may have are a halogen atom, an alkoxyl group and so on. Examples of substituents which the phenyl or phenoxy group represented by Y may have are an alkyl group, an alkoxyl group, a halogen atom, a nitro group, etc.

Examples of the group

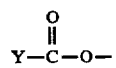

are acetoxy, methoxycarbonyloxy, ethoxycarbonyloxy, benzyloxycarbonyloxy, phenoxycarbonyloxy, fluorenylmethoxycarbonyloxy, etc.

A hydroxyl group is preferred as the group $R^1$. Preferred among the alkyl groups of $R^2$ and $R^3$ are $C_{1-4}$ alkyl groups such as methyl, ethyl, etc.

Preferred among the alkyl groups of $R^4$ and $R^5$ are $C_{1-4}$ alkyl groups such as methyl, ethyl, etc. Aralkyl groups of $R^4$ and $R^5$ are, for example, benzyl, phenethyl, etc. Aryl groups of $R^4$ and $R^5$ are, for example, phenyl, phenethyl, etc. Substituents on the alkyl, aralkyl or aryl group are $C_{1-4}$ alkyl groups such as methyl, ethyl, etc., $C_{1-4}$ alkoxyl groups such as methoxy, etc., halogen, nitro, etc. The epoxy compound wherein at least one of $R^4$ and $R^5$ groups is a benzyl group contributes to improvement of low temperature curability and film properties and is therefore desirable to use.

Examples of the halogen atom in the formula (1) are fluorine, chlorine, bromine, etc. among which chlorine and fluorine are preferred.

The aromatic sulfonium salt of the formula (1) wherein $X^-$ is $SbF_6^-$ is effective in improving the low temperature curability and film properties, and is therefore desirable to use.

A preferred combination of groups in the formula (1) is as follows: $R^1$ is a hydroxyl group, alkoxyl group or the group

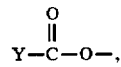

each of $R^2$ and $R^3$ is a hydrogen atom, $R^4$ is a benzyl group, $R^5$ is an alkyl group, and $X^-$ is $SbF_6^-$.

Examples of the aromatic sulfonium salt of the formula (1) are benzyl-4-hydroxyphenylmethylsulfonium hexafluoroantimonate, benzyl-4-hydroxyphenylmethylsulfonium hexafluorophosphate, 4-acetoxyphenylbenzylmethylsulfonium hexafluoroantimonate, 4-acetoxyphenyldimethylsulfonium hexafluoroantimonate, benzyl-4-methoxyphenylmethylsulfonium hexafluoroantimonate, benzyl-2-methyl-4-hydroxyphenylmethylsulfonium hexafluoroantimonate, benzyl-3-chloro-4-hydroxyphenylmethylsulfonium hexafluoroarsenate, benzyl-3-methyl-4-hydroxy-5-tert-butylphenylmethylsulfonium hexafluoroantimonate, 4-methoxybenzyl-4-hydroxyphenylmethylsulfonium hexafluorophosphate, dibenzyl-4-hydroxyphenylsulfonium hexafluoroantimonate, dibenzyl-4-hydroxyphenylsulfonium hexafluorophosphate, 4-acetoxyphenyldibenzylsulfonium hexafluoroantimonate, dibenzyl-4-methoxyphenylsulfonium hexafluoroantimonate, nitrobenzyl-4-hydroxyphenylimethylsulfonium hexafluoroantimonate, 3,5-dinitrobenzyl-4-hydroxyphenylmethylsulfonium hexafluoroantimonate, β-naphthylmethyl-4-hydroxyphenylmethylsulfonium hexafluoroantimonate, etc.

Commercially available aromatic sulfonium salts of the formula (1) include, for example, Sanaid SI-L85, Sanaid SI-L110, Sanaid SI-L145, Sanaid SI-L160, Sanaid SI-H15, Sanaid SI-H20, Sanaid SI-H25, Sanaid SI-H40, Sanaid SI-H50, Sanaid SI-60L, Sanaid SI-80L, Sanaid SI-100L, Sanaid SI-80, and Sanaid SI-100 (trademarks, products of Sanshin Chemical Industry KK), etc.

The amount of the aromatic sulfonium salt of the formula (1) used in the invention is about 0.01 to about 10 parts by weight, preferably about 0.1 to about 5 parts by weight, per 100 parts by weight of the epoxy compound (all calculated as solids). The use of less than about 0.01 part by weight reduces the curability and impairs the water resistance, corrosion resistance, weatherability, processability, etc., whereas the use of more than about 10 parts by weight degrades the appearance of the coating film. Hence it is undesirable to use the compound in an amount outside said range.

The thermosetting coating composition of the invention comprising the epoxy compound and the aromatic sulfonium salt of the formula (1) [hereinafter referred to as "coating composition (I)"] can be suitably used as either a powder coating composition or an organic solvent coating composition. The powder coating composition (I) comprises the epoxy compound as a base resin for the powder composition and the aromatic sulfonium salt of the formula (1). The organic solvent coating composition (I) comprises the epoxy compound dissolved or dispersed in an organic solvent and the aromatic sulfonium salt of the formula (1). These compositions can be easily prepared in the conventional manner.

Organic solvents which can be used for the organic solvent coating composition (I) can be any of suitable solvents insofar as they are capable of dissolving or dispersing the epoxy compound and they are substantially not reactive with an epoxy group. Specific examples of such solvents are aromatic solvents such as toluene, xylene, etc., alcohols such as ethanol, propanol, butanol, etc., ethers such as ethyl cellosolve, butyl cellosolve, etc., ketones such as methyl isobutyl ketone, etc., and acetates such as butyl acetate, cellosolve acetate, etc.

Optionally the coating composition (I) may further contain coloring agents, fillers, ultraviolet stabilizers, ultraviolet absorbing agents, rheology control agents, cissing inhibitors, sag inhibitors, curing agents and so on in addition to said components.

According to the present invention, there are also provided a thermosetting coating composition comprising the composition (I) and an acidic pigment (C) [hereinafter referred to as "coating composition (II)"], and a thermosetting coating composition comprising the composition (I), a neutral or basic pigment (D) and an acidic substance (E) [hereinafter referred to as "coating composition (III)"].

The coating composition (II) comprises the epoxy compound (A), the aromatic sulfonium salt (B) and the acidic pigment (C) as the essential components.

The species and amounts of the epoxy compound and the aromatic sulfonium salt of the formula (1) which can be used in the coating composition (II) are the same as in the coating composition (I).

The acidic pigment (C) useful for the coating composition (II) has a pH of 7.0 (exclusive) to 2.0 (inclusive) as determined by measuring the concentration of hydrogen ion in a suspension of the pigment in distilled water. Generally the pH of a pigment depends on the surface condition of the pigment, its solubility, conditions for preparing the pigment, surface treating agent used, etc. The concentration of hydrogen ion can be determined by suspending 5 g of the pigment in 100 g of distilled water, thoroughly stirring the suspension, allowing the suspension to stand for 1 to 3 days, and measuring the concentration of hydrogen ion in the supernatant liquid using a pH meter or the like. A pigment having a pH of not lower than 7.0 reduces the polymerization catalyst action of the aromatic sulfonium salt on the epoxy compound, resulting in the impairment of low temperature curability, whereas a pigment below 2.0 in pH degrades the surface smoothness of coating film. Hence it is undesirable to use a pigment with a pH outside said range. The pH of the pigment is preferably about 6.5 to about 2.5, more preferably about 6.0 to about 3.0.

The acidic pigments are variable in pH depending, as described above, on the surface condition of the pigment, its solubility, conditions for preparing the pigment, surface treating agent used, etc. For example, titanium dioxides produced by different manufacturers may be widely varied in pH from 4.0 to 10.0 although they pertain to the same species, white pigment. Thus, a pigment can be actually determined to be acidic or basic by measuring the pH. Useful acidic pigments include, for example, coloring pigments, extender pigments, metallic pigments, pearlessence pigments, etc. Useful coloring pigments include, for example, white pigment, blue pigment, green pigment, red pigment, yellow pigment, orange-colored pigment, purple pigment, etc.

The amount of the acidic pigment (C) used in the coating composition (II) can be selected according to the required film appearance, film properties and the like. Its amount is about 0.1 to about 500 parts by weight, preferably about 1 to about 200 parts by weight, per 100 parts by weight of the epoxy compound.

The coating composition (II) can be used as a powder coating composition or an organic solvent coating composition.

The powder coating composition (II) can be prepared in the conventional manner. For example, the epoxy compound (A), the aromatic sulfonium salt (B), and the acidic pigment (C) are mixed by a dry process using a Henschel mixer or the like, and the mixture is melted and mixed by a twin-screw extruder. Useful acidic pigments include pigment chips prepared by being dispersed with a pigment dispersant such as an epoxy resin.

The organic solvent coating composition (II) can be prepared in the conventional manner. For example, the epoxy compound (A) is dissolved or dispersed in an organic solvent after which the aromatic sulfonium salt (B) and an acidic pigment (C) paste are mixed with the organic solvent solution. The acidic pigment paste can be produced by mixing the acidic pigment with an organic solvent solution of the epoxy compound using a roll mill, sand mill, pebble mill or like dispersing machines.

Organic solvents which can be used for the organic solvent coating composition (II) are selected from those which are capable of dissolving or dispersing the epoxy compound and which are substantially not reactive with an epoxy group. Specific examples of such solvents are aromatic solvents such as toluene, xylene, etc., alcohols such as ethanol, propanol, butanol, etc., ethers such as ethyl cellosolve, butyl cellosolve, etc., ketones such as methyl isobutyl ketone, etc., and acetates such as butyl acetate, cellosolve acetate, etc.

Optionally the coating composition (II) may further contain coloring agents, fillers, ultraviolet stabilizers, ultraviolet absorbing agents, rheology control agents, cissing inhibitors, sag inhibitors, pigment dispersants, curing agents, other resins (such as polycarboxylic acid resins, polyol resins, hydrolyzable silyl group-containing compounds, etc.) and so on in addition to said components.

The coating composition (III) comprises the epoxy compound (A), the aromatic sulfonium salt (B), the neutral or basic pigment (D) and the acidic substance (E) as the essential components.

Useful species of the epoxy compound (A) and the aromatic sulfonium salt (B) for the coating composition (III) include those exemplified above for the coating composition (I). The respective amounts are also as described above for the coating composition (I).

The neutral or basic pigment (D) that can be used herein has a pH of 7.0 (inclusive) to 13.0 (inclusive) as determined by measuring the concentration of hydrogen ion in a suspension of the pigment in distilled water.

The concentration of hydrogen ion can be determined in the same manner as described above for the coating composition (II).

The neutral or basic pigment is variable in pH depending on the surface condition of the pigment, its solubility, conditions for preparing the pigment, surface treating agent used, etc. For example, titanium dioxides (although all pertaining to the white pigment) produced by different manufacturers are widely varied in pH from 4.0 to 10.0. Thus, a pigment can be actually determined to be acidic, neutral or basic by measuring the pH.

Neutral or basic pigments include, for example, coloring pigments, extender pigments, metallic pigments, pearlessence pigments, etc. Useful coloring pigments include, for example, white pigment, blue pigment, green pigment, red pigment, yellow pigment, orange-colored pigment, purple pigment, etc.

The amount of the neutral or basic pigment (D) used in the invention can be selected according to the required film appearance, film properties and the like. Its amount is about 0.1 to about 500 parts by weight, preferably about 1 to about 200 parts by weight, per 100 parts by weight of the epoxy compound.

If the neutral or basic pigment (D) used has a pH of not lower than 7.0, the cationic polymerization catalyst action of the aromatic sulfonium salt (B) on the epoxy compound (A) is reduced and the low temperature curability is degraded. The acidic substance (E) is used to avoid the decrease of polymerization catalyst action.

The acidic substance (E) is an organic or inorganic acidic one having an average of at least one acid group selected from a carboxyl group, sulfonic acid group, phosphoric acid group, etc. in a molecule. Specific examples of useful acidic substances are inorganic acid compounds such as sulfuric acid, phosphoric acid, etc., and organic acid compounds such as capric acid, lauric acid, stearic acid, oleic acid, maleic acid, adipic acid, sebacic acid, azelaic acid, dodecanoic diacid, castor oil fatty acid, coconut oil fatty acid, alkylsulfonic acid and like fatty acids, benzenesulfonic acid, paratoluenesulfonic acid, dodecylbenzenesulfonic acid, benzoic acid and like aromatic acids, anionic surfactants, resins, etc. The resins useful as the organic acid compounds include, for example, radical homopolymers of unsaturated acid monomers such as (meth)acrylic acid, maleic acid and like unsaturated carboxylic acid monomers, mono(2-hydroxyethyl (meth)acrylate)acid phosphate and like unsaturated phosphoric acid monomers, etc., copolymers of such unsaturated acid monomers with said other unsaturated monomers, carboxyl-containing ester resins, carboxyl-containing alkyd resins, etc. These resins have a number average molecular weight of about 300 to about 80,000, preferably about 500 to about 50,000, and an acid value of about 10 to about 1,000, preferably about 20 to about 500.

The acidic substance (E) may be dispersed together with the neutral or basic pigment (D) for use as pigment chips or as a pigment paste or may be mixed with the epoxy compound (A) instead of being dispersed together with the pigment (D).

The amount of the acidic substance (E) used in the coating composition (III) is variable depending on the kind of the acidic substance (E) and on the kind and amount of the neutral or basic pigment (D), but is suitably in the range of about 0.01 to about 200 parts by weight, preferably about 0.1 to about 100 parts by weight, per 100 parts by weight of the epoxy compound (A). The use of less than about 0.01 parts by weight impairs the low temperature curability, whereas the use of more than about 200 parts by weight degrades the water resistance and weatherability due to an increased amount of acid group remaining in the coating film. Hence it is undesirable to use the acidic substance (E) in an amount outside said range.

The coating composition (III) like the coating composition (I) can be used in the form of either a powder coating composition or an organic solvent coating composition.

The powder coating composition (III) can be prepared in the conventional manner. For example, the epoxy compound (A), the aromatic sulfonium salt (B) and the neutral or basic pigment (D) as chips (such as the neutral or basic pigment (D) coated with the acidic substance (E)) are mixed by a dry process using a Henschel mixer or the like, and the mixture is melted and mixed by a twin-screw extruder.

The organic solvent coating composition (III) can be prepared in the conventional manner. For example, the epoxy compound (A) is dissolved or dispersed in an organic solvent, and the solution is admixed with the aromatic sulfonium salt (B) and a pigment paste of the neutral or basic pigment (D). The pigment paste can be prepared, for example, by dispersing or mixing a solution of the acidic substance (E) in an organic solvent and the neutral or basic pigment (D) using a roll mill, sand mill, pebble mill or like dispersing machines. The organic solvents exemplified hereinbefore can be used for the organic solvent coating composition (III).

Optionally the coating composition (III) may further contain coloring agents, fillers, ultraviolet stabilizers, ultraviolet absorbing agents, rheology control agents, cissing inhibitors, sag inhibitors, pigment dispersants, curing agents, other resins (such as polyol resins, hydrolyzable silyl group-containing compounds, etc.) and so on in addition to said components.

The coating composition of the invention is excellent in low temperature curability and is formable into a coating film by its application to a substrate and baking at, e.g. about 120° C. or higher for curing. For example, the baking is conducted for about 30 to about 60 minutes at 120° C., or for about 20 to about 40 minutes at 150° C.

Substrates to be coated with the coating composition of the invention includes those of metals such as iron and aluminum, inorganic materials such as glasses, plastics such as polyesters, etc. and those of these materials surface-treated or covered with an undercoat.

The coating composition of the invention is applied to substrates by the per se known methods. For example, the powder coating composition can be applied by electrostatic powder coating, tribo electrostatic powder coating, fluidization dip coating, etc., and the organic solvent coating composition is applicable by spray coating, brushing, roller coating, curtain flow coating, etc.

The thickness of coating film is not critical. A suitable film thickness is about 30 µm to about 1 mm, preferably about 50 µm to about 200 µm in the case of the powder coating composition and about 10 µm to about 150 µm, preferably about 20 µm to about 80 µm in the case of the organic solvent coating composition.

The present invention is described below in more detail with reference to the following Preparation Examples, Examples and Comparative Examples.

PREPARATION EXAMPLE 1

Preparation of epoxy resin solution (i)

A reactor equipped with a stirrer, thermometer, nitrogen inlet tube and reflux condenser was charged with 100 g of toluene, 40 g of glycidyl methacrylate, 10 g of styrene, 20 g of methyl methacrylate, 30 g of n-butyl acrylate and 6 g of azoisobutyronitrile. The mixture was heated to 105° C. in a nitrogen atmosphere and underwent reaction at the same temperature for 6 hours, giving an epoxy resin solution (i) useful for organic solvent coating compositions and having a solid content of 50% by weight. The epoxy resin thus obtained had a number average molecular weight of about 8,000 and an epoxy equivalent of 350.

PREPARATION EXAMPLE 2

Preparation of epoxy resin solution (ii)

The procedure of Preparation Example 1 was repeated with the exception of using as the monomer components 40 g of 3,4-epoxycyclohexylmethyl methacrylate, 10 g of styrene, 20 g of methyl methacrylate, and 30 g of n-butyl acrylate, giving an epoxy resin solution (ii) useful for organic solvent coating compositions and having a solid content of 50% by weight. The epoxy resin thus obtained had a number average molecular weight of about 8,000 and an epoxy equivalent of 490.

PREPARATION EXAMPLE 3
Preparation of epoxy resin solution (iii)

The procedure of Preparation Example 2 was repeated with the exception of using as the monomer components 30 g of 3,4-epoxycyclohexylmethyl methacrylate, 20 g of γ-methacryloyloxypropyl trimethoxysilane, 20 g of hydroxyethyl methacrylate, 15 g of methyl methacrylate, and 15 g of n-butyl acrylate, giving an epoxy resin solution (iii) useful for organic solvent coating compositions and having a solid content of 50% by weight. The epoxy resin thus obtained had a number average molecular weight of about 9,000 and an epoxy equivalent of 650.

PREPARATION EXAMPLE 4
Preparation of epoxy resin (iv)

The procedure of Preparation Example 1 was repeated with the exception of using as the monomer components 30 g of glycidyl methacrylate, 10 g of styrene, 40 g of methyl methacrylate, 10 g of n-butyl methacrylate and 10 g of n-butyl acrylate, giving an epoxy resin solution. The toluene was removed from the solution under a reduced pressure, giving an epoxy resin (iv) useful for powder coating compositions and having a solid content of 100% by weight. The epoxy resin thus obtained had a number average molecular weight of about 8,000 and an epoxy equivalent of 470.

Examples for coating composition (I)

EXAMPLE 1

The epoxy resin solution (i) (200 g) was admixed with 0.5 g of benzyl-4-hydroxyphenylmethylsulfonium hexafluoroantimonate as a cationic polymerization catalyst to provide an organic solvent coating composition according to the invention.

EXAMPLE 2

The epoxy resin solution (ii) (200 g) was admixed with 0.5 g of benzyl-4-methoxyphenylmethylsulfonium hexafluoroantimonate as a cationic polymerization catalyst to provide an organic solvent coating composition according to the invention.

EXAMPLE 3

The epoxy resin solution (iii) (200 g) was admixed with 0.5 g of 4-acetoxyphenyldimethylsulfonium hexafluoroantimonate as a cationic polymerization catalyst to provide an organic solvent coating composition according to the invention.

EXAMPLE 4

The epoxy resin solution (i) (200 g) was admixed with 0.5 g of dibenzyl-4-hydroxyphenylsulfonium hexafluoroantimonate as a cationic polymerization catalyst to provide an organic solvent coating composition according to the invention.

COMPARATIVE EXAMPLE 1

The epoxy resin solution (i) (200 g) was admixed with 1 g of boron trifluoride to provide a comparative organic solvent coating composition.

COMPARATIVE EXAMPLE 2

The epoxy resin solution (i) (200 g) was admixed with 70 g of polycarboxylic acid (a solution of half ester of 1 mol of neopentyl glycol with 2 mols of hexahydrophthalic anhydride in 50% by weight of methyl isobutyl ketone) to provide a comparative organic solvent coating composition.

COMPARATIVE EXAMPLE 3

A comparative organic solvent coating composition was prepared by admixing the composition of Comparative Example 2 with 1 g of tetraethylammonium bromide to provide a comparative organic solvent coating composition.

The coating compositions prepared in Examples 1 to 4 and Comparative Examples 1 to 3 were tested for properties. The results are shown below in Table 1.

TABLE 1

|  | Example | | | | Comparative Example | | |
|---|---|---|---|---|---|---|---|
|  | 1 | 2 | 3 | 4 | 1 | 2 | 3 |
| Storage stability | A | A | A | A | C | B | C |
| Film properties |  |  |  |  |  |  |  |
| Specular reflectivity | 97 | 96 | 98 | 96 | 95 | 98 | 85 |
| Appearance | A | A | A | A | A | A | A |
| Curability | A | A | A | A | B | C | B |
| Pencil hardness | 2H | 3H | 3H | 2H | B | 2B | 2H |
| Processability | 3.0 | 3.0 | 3.0 | 3.0 | 0.5 | 0.5 | 3.0 |
| Accelerated weatherability | A | A | A | A | B | C | A |

The storage stability of the coating compositions as shown in Table 1 was determined by the following method.

The coating composition diluted to a viscosity of 30 seconds (Ford cup No.4, 20° C.) was used as a sample. The sample was stored in a hermetically closed state at 60° C. for 16 hours, and the viscosity of the sample was evaluated on A to D scale: A) the viscosity increased to 0 to 5 seconds, B) the viscosity increased to 6 to 10 seconds, C) the viscosity increased to 11 seconds or longer, and D) the sample gelled.

The tests for film properties as shown in Table 1 were carried out by the following methods.

Substrates to be coated: A steel plate treated with zinc phosphate was sprayed with the coating composition to give a coating film having a dry thickness of about 40 μm, and the coated plate was baked at 120° C. for 30 minutes. The obtained plate was used in the tests.

Specular reflectivity: The 60° specular gloss was measured according to JIS K-5400.

Appearance: The coating surface was visually inspected and the results were evaluated according to the following criteria: A) free of abnormality in surface smoothness such as shrinks; B) abnormality in surface smoothness such as shrinks; C) marked abnormality in surface smoothness such as shrinks.

Curability: The coating surface was scrubbed to and fro by 10 reciprocating strokes with a gauze piece soaked with xylene using a finger tip. Then the appearance of coating surface was rated on A to C scale: A) no change in the coating surface (good curability), B) slightly marred (poor curability), C) coating surface partly dissolved (markedly low curability).

Pencil hardness: Evaluated in terms of scratch according to JIS K-5400.

Processability: The distance (mm) of extrusion involved until cracking or flaking occurs in an extrusion process using Erichsen film distensibility tester.

Accelerated weatherability: Measured by an accelerated weatherability tester (product of Q Panel Co., Ltd.). The sample was irradiated with UV rays at 60° C. for 16 hours and exposed to condensed water at 50° C. for 8 hours as one cycle. After repeating this cycle for 2,000 hours, the coating film was evaluated according to the criteria of: A) the coating surface almost remaining unchanged, B) reduced in gloss, C) markedly reduced in gloss and suffering cracking and discoloration.

EXAMPLE 5

A 1,000 g quantity of the epoxy resin (iv) obtained above was pulverized to give coarse particles about 1 to about 5 mm in particle size. The particles were admixed with 5 g of benzyl-4-hydroxyphertylmethylsulfonium hexafluoroantimonate, and dry blended. The blend was melted, mixed and dispersed by a twin-screw extruder. The dispersion was cooled, coarsely and finely divided and filtered through a filter of 150 mesh, giving a powder coating composition according to the invention for electrostatic coating.

COMPARATIVE EXAMPLE 4

A comparative powder coating composition was prepared in the same manner as in Example 5 with the exception of using 320 g of dodecanoic diacid in place of 5 g of benzyl-4-hydroxyphenyl-methylsulfonium hexafluoroantimonate.

The coating compositions prepared in Example 5 and Comparative Example 4 were tested for properties. The results are shown below in Table 2.

TABLE 2

|  | Example 5 | Comp. Example 4 |
|---|---|---|
| Storage stability | A | C |
| Film properties |  |  |
| Specular reflectivity | 98 | 97 |
| Appearance | A | A |
| Curability | A | C |
| Pencil hardness | 2H | 2B |
| Processability | 3.0 | 0.5 |
| Accelerated weatherability | A | C |
| Salt spray | 0.5 | 5 or more |

The tests were carried out by the following methods.

The storage stability of the powder coating compositions in Table 2 was determined by the following method.

The powder coating compositions were stored in an atmosphere at 40° C. for 7 days and then evaluated in respect of blocking resistance according to the criteria of: A) no particles were fusion-bonded (high blocking resistance), B) the particles were fusion-bonded but made discrete by fingers, C) the particles were fusion-bonded and not made discrete by fingers (very low blocking resistance).

Substrates to be coated: A steel plate treated with zinc phosphate was coated by electrostatic powder coating with the coating composition to give a coating film having a dry thickness of about 80 μm, and the coated plate was baked at 150° C. for 20 minutes. The obtained plate was used in the tests.

Salt spray: Tested according to JIS K-5400. After cutting crosswise the coated substrate to the substrate, the breadth of creep (mm) in the cut was measured.

The properties shown in Table 2 including specular reflectivity, appearance, curability, pencil hardness, process- ability and accelerated weatherability were assessed in the same manner as above.

Examples for coating compositions (II) and (III)

EXAMPLE 6

A mixture of 200 g of the epoxy resin solution (i) (solid content 100 g) and 100 g of titanium dioxide a as a white pigment (sulfuric acid method, rutile type, average particle size about 0.2 to about 0.3 μm, pH 4.5) was diluted with xylol for the viscosity adjustment, and dispersed by a shaker. A 2.0 g quantity of benzyl-4-hydroxyphenylmethylsulfonium hexafluoroantimonate as a cationic polymerization catalyst was added to give an organic solvent coating composition according to the present invention.

EXAMPLES 7 TO 19 AND COMPARATIVE EXAMPLES 5 TO 10

Organic solvent coating compositions were prepared for the present invention and for comparative purpose in the same manner as in Example 6 according to the formulation as shown below in Table 3.

TABLE 3

| | Example | | | | | | |
|---|---|---|---|---|---|---|---|
| | 6 | 7 | 8 | 9 | 10 | 11 | 12 |
| Epoxy resin: | | | | | | | |
| Type | (i) | (i) | (i) | (ii) | (ii) | (ii) | (iii) |
| Amount | 100 | 100 | 100 | 100 | 100 | 100 | 100 |
| Epikote 1004 (amount) | | | | | | | |
| Cationic polymerization catalyst | 2.0 | 2.0 | 2.0 | 2.0 | 2.0 | 2.0 | 2.0 |
| Titanium dioxide: | | | | | | | |
| Type | a | b | c | a | b | c | a |
| Amount | 100 | 100 | 100 | 100 | 100 | 100 | 100 |

| | Example | | | | | | |
|---|---|---|---|---|---|---|---|
| | 13 | 14 | 15 | 16 | 17 | 18 | 19 |
| Epoxy resin: | | | | | | | |
| Type | (iii) | (iii) | | | | | |
| Amount | 100 | 100 | | | | | |
| Epikote 1004 (amount) | | | 100 | 100 | 100 | 100 | 100 |
| Cationic polymerization catalyst | 2.0 | 2.0 | 2.0 | 2.0 | 2.0 | 2.0 | 2.0 |
| Titanium dioxide: | | | | | | | |
| Type | b | c | a | b | c | d | e |
| Amount | 100 | 100 | 100 | 100 | 100 | 100 | 100 |

| | Comparative Example | | | | | |
|---|---|---|---|---|---|---|
| | 5 | 6 | 7 | 8 | 9 | 10 |
| Epoxy resin: | | | | | | |
| Type | (i) | (i) | (ii) | (iii) | | |
| Amount | 100 | 100 | 100 | 100 | | |
| Epikote 1004 (amount) | | | | | 100 | 100 |
| Cationic polymerization catalyst | 2.0 | 2.0 | 2.0 | 2.0 | 2.0 | 2.0 |
| Titanium dioxide: | | | | | | |
| Type | f | g | f | f | f | g |
| Amount | 100 | 100 | 100 | 100 | 100 | 100 |

The amounts (gram) shown in Table 3 were calculated on solid basis. Benzyl-4-hydroxyphenylmethylsulfonium hexafluoroantimonate was used as a cationic polymerization catalyst. Epikote 1004 and titanium dioxide a–g mean the following.

Epikote 1004: trademark, bisphenol A-epichlorohydrin type epoxy resin (number average molecular weight 1,400, epoxy equivalent 880) manufactured by Yuka Shell Epoxy Co., Ltd. The resin was used as dissolved in toluene at a concentration of 50% by weight, calculated as solids.

Titanium dioxide: prepared by a sulfuric acid method, rutile type, average particle size about 0.2 to about 0.3 μm. Titanium dioxide a is 4.5 in pH, titanium dioxide b 5.1 in pH, titanium dioxide c 6.3 in pH, titanium dioxide f 7.5 in pH, and titanium dioxide g 9.7 in pH. Titanium dioxide d is a pigment paste prepared by dispersing titanium dioxide g in an acrylic resin (as an acidic substance, average molecular weight 5,000 and acid value 100) at a weight ratio of 10/1 (titanium dioxide/acrylic resin). Titanium dioxide e is a pigment paste prepared by dispersing titanium dioxide g in an alkyd resin (as an acidic substance, average molecular weight 2,000 and acid value 100) at a ratio of 10/1 (titanium dioxide/alkyd resin).

The coating compositions prepared in Examples 6 to 19 and Comparative Examples 5 to 10 were tested for properties. The results are shown below in Table 4.

TABLE 4

| | Example | | | | | | |
|---|---|---|---|---|---|---|---|
| | 6 | 7 | 8 | 9 | 10 | 11 | 12 |
| Specular reflectivity | 89 | 90 | 92 | 89 | 90 | 91 | 92 |
| Appearance | A | A | A | A | A | A | A |
| Curability | A | A | A | A | A | A | A |
| Processability | 3.0< | 3.0< | 3.0< | 3.0< | 3.0< | 3.0< | 3.0< |

| | Example | | | | | | |
|---|---|---|---|---|---|---|---|
| | 13 | 14 | 15 | 16 | 17 | 18 | 19 |
| Specular reflectivity | 92 | 93 | 88 | 90 | 90 | 92 | 91 |
| Appearance | A | A | A | A | A | A | A |
| Curability | A | A | A | A | A | A | A |
| Processability | 3.0< | 3.0< | 3.0< | 3.0< | 3.0< | 3.0< | 3.0< |

| | Comparative Example | | | | | |
|---|---|---|---|---|---|---|
| | 5 | 6 | 7 | 8 | 9 | 10 |
| Specular reflectivity | 92 | 92 | 90 | 89 | 90 | 91 |
| Appearance | A | A | A | A | A | A |
| Curability | B | C | B | B | B | C |
| Processability | 0.5 | 0.5 | 0.5 | 0.5 | 0.5 | 0.5 |

The tests for film properties as shown in Table 4 were carried out by the following methods.

Substrates to be coated: A steel plate treated with zinc phosphate was sprayed with the coating composition to give a coating film having a dry thickness of about 40 μm, and the coated plate was baked at 120° C. for 30 minutes. The obtained plate was used in the tests.

Specular reflectivity: The 60° specular gloss was measured according to JIS K-5400.

Appearance: The coating surface was visually inspected and the results were evaluated according to the following criteria: A) free of abnormality in surface smoothness such as shrinks; B) abnormality in surface smoothness such as shrinks; C) marked abnormality in surface smoothness such as shrinks.

Curability: The coating surface was scrubbed to-and-fro by 10 reciprocating strokes with a gauze piece soaked with xylene using a finger tip. Then the appearance of coating surface was rated on A to C scale: A) no change in the coating surface (good curability), B) slightly marred (poor curability), C) coating surface partly dissolved (markedly low curability).

Processability: The distance (mm) of extrusion involved until cracking or flaking occurs in an extrusion process using Erichsen film distensibility tester.

EXAMPLE 20

A 1,000 g (calculated as solids) quantity of the epoxy resin (iv), 500 g of titanium dioxide a and 20 g of benzyl-4-hydroxyphenylmethylsulfonium hexafluoroantimonate as a cationic polymerization catalyst were dry blended. The blend was melted, mixed and dispersed by a twin-screw extruder. The dispersion was cooled, coarsely and finely divided and filtered through a filter of 150 mesh, giving a powder coating composition according to the invention for electrostatic coating.

EXAMPLES 21 TO 30 AND COMPARATIVE EXAMPLES 11 TO 14

Powder coating compositions were prepared for the invention and for comparative purpose in the same manner as in Example 20 according to the formulation as shown below in Table 5.

TABLE 5

| | Example | | | | | | |
|---|---|---|---|---|---|---|---|
| | 21 | 22 | 23 | 24 | 25 | 26 | 27 |
| Epoxy resin: | | | | | | | |
| Type | (iv) | (iv) | (iv) | (iv) | (iv) | | |
| Amount | 100 | 100 | 100 | 100 | 100 | | |
| Epikote 1004 (amount) | | | | | | 100 | 100 |
| Cationic polymerization catalyst | 2.0 | 2.0 | 2.0 | 2.0 | 2.0 | 2.0 | 2.0 |
| Titanium dioxide: | | | | | | | |
| Type | a | b | c | d | e | a | b |
| Amount | 50 | 50 | 50 | 50 | 50 | 50 | 50 |

| | Example | | | Comparative Example | | | |
|---|---|---|---|---|---|---|---|
| | 28 | 29 | 30 | 11 | 12 | 13 | 14 |
| Epoxy resin: | | | | | | | |
| Type | | | | (iv) | (iv) | | |
| Amount | | | | 100 | 100 | | |
| Epikote 1004 (amount) | 100 | 100 | 100 | | | 100 | 100 |
| Cationic polymerization catalyst | 2.0 | 2.0 | 2.0 | 2.0 | 2.0 | 2.0 | 2.0 |
| Titanium dioxide: | | | | | | | |
| Type | c | d | e | f | g | f | f |
| Amount | 50 | 50 | 50 | 50 | 50 | 50 | 50 |

The amounts (gram) shown in Table 5 were calculated on solid basis. Benzyl-4-hydroxyphenylmethylsulfonium hexafluoroantimonate was used as a cationic polymerization catalyst. Epikote 1004 and titanium dioxide a–g are as set forth hereinbefore.

The coating compositions prepared in Examples 21 to 30 and Comparative Examples 11 to 14 were tested for properties with the results shown below in Table 6.

TABLE 6

|  | Example |  |  |  |  |  |  |
|---|---|---|---|---|---|---|---|
|  | 21 | 22 | 23 | 24 | 25 | 26 | 27 |
| Specular reflectivity | 87 | 89 | 90 | 92 | 92 | 86 | 87 |
| Appearance | A | A | A | A | A | A | A |
| Curability | A | A | A | A | A | A | A |
| Processability | 3.0< | 3.0< | 3.0< | 3.0< | 3.0< | 3.0< | 3.0< |

|  | Example |  |  | Comparative Example |  |  |  |
|---|---|---|---|---|---|---|---|
|  | 28 | 29 | 30 | 11 | 12 | 13 | 14 |
| Specular reflectivity | 89 | 86 | 88 | 92 | 93 | 90 | 88 |
| Appearance | A | A | A | A | A | A | A |
| Curability | A | A | A | B | C | B | C |
| Processability | 3.0< | 3.0< | 3.0< | 0.5 | 0.5 | 0.5 | 0.5 |

The tests for film properties as shown in Table 6 were carried out by the following methods.

Substrates to be coated: A steel plate treated with zinc phosphate was coated by electrostatic powder coating with the coating composition to give a coating film having a dry thickness of about 80 μm, and the coated plate was baked at 150° C. for 20 minutes. The obtained plate was used in the tests.

The properties including specular reflectivity, appearance, curability and processability were assessed in the same manner as above.

The aromatic sulfonium salt present in the coating compositions of the present invention does not act as a catalyst for the cationic polymerization of an epoxy group at a low temperature (e.g. about 40° C.) but acts as a cationic polymerization catalyst at an elevated temperature (e.g. about 120° C). Consequently the thermosetting coating compositions of the invention in one package form are excellent in storage stability and outstanding in low temperature curability, finished appearance, hardness, weatherability, water resistance, processability, etc.

What is claimed is:

1. A thermosetting powder coating composition consisting essentially of:

(A) a solid epoxy compound having a melting point of about 60° to about 200° C., and (B) an aromatic sulfonium salt represented by the formula

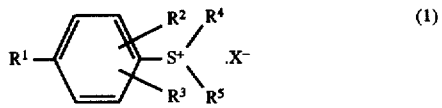

(1)

wherein $R^1$ represents a hydroxyl group, each of $R^2$ and $R^3$ represents a hydrogen atom, $R^4$ represents a benzyl group, $R^5$ represents an alkyl group, and $X^-$ represents $SbF_6^-$.

2. The thermosetting powder coating composition according to claim 1 wherein the number average molecular weight of the epoxy compound is about 130 to about 100,000, and the epoxy equivalent of the epoxy compound is about 65 to about 50,000.

3. The thermosetting powder coating composition according to claim 1 wherein the aromatic sulfonium salt of the formula (1) is benzyl-4-hydroxyphenylmethysulfonium hexafluoroantimonate.

4. The thermosetting powder coating composition according to claim 1 which contains about 0.01 to about 10 parts by weight (solid basis) of the aromatic sulfonium salt of the formula (1) per 100 parts by weight (solid basis) of the epoxy compound.

5. A thermosetting powder coating composition consisting essentially of:

(A) a solid epoxy compound having a melting point of about 60° to about 200° C., (B) an aromatic sulfonium salt represented by the formula

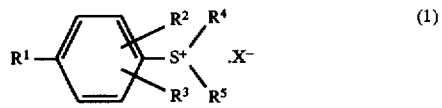

(1)

wherein $R^1$ represents a hydroxyl group, each of $R^2$ and $R^3$ represents a hydrogen atom, $R^4$ represents a benzyl group, $R^5$ represents an alkyl group, and $X^-$ represents $SbF_6^-$, and (C) an acidic pigment.

6. A thermosetting powder coating composition consisting essentially of:

(A) a solid epoxy compound having a melting point of about 60° to about 200° C., (B) an aromatic sulfonium salt represented by the formula

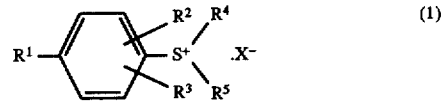

(1)

wherein $R^1$ represents a hydroxyl group, each of $R^2$ and $R^3$ represents a hydrogen atom, $R^4$ represents a benzyl group, $R^5$ represents an alkyl group, and $X^-$ represents $SbF_6^-$, (D) a neutral or basic pigment, and (E) an acidic substance.

7. A thermosetting powder coating composition according to claim 1, wherein $R_5$ is a $C_{1-4}$ alkyl.

* * * * *